B. Burling,
Stump Elevator.
Nº 1,195.  Patented June 25, 1839.
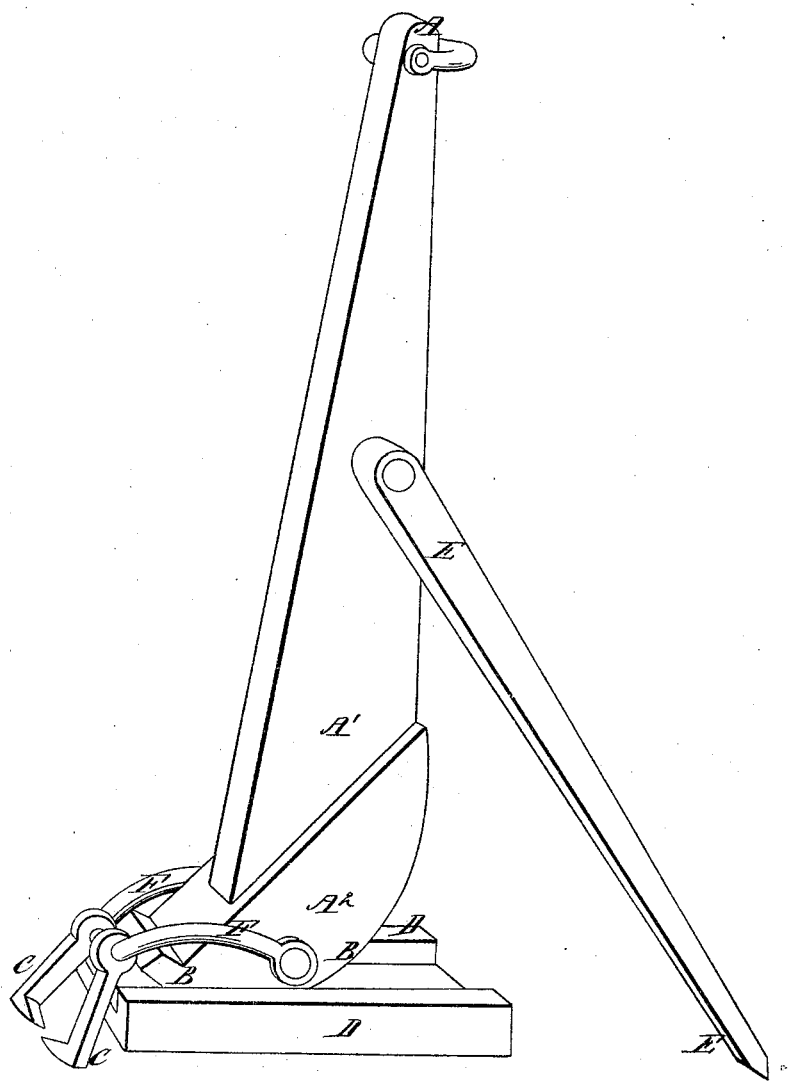

UNITED STATES PATENT OFFICE.

BENJAMIN BURLING, OF CATHARINE, NEW YORK.

STUMP-MACHINE.

Specification of Letters Patent No. 1,195, dated June 25, 1839.

*To all whom it may concern:*

Be it known that I, BENJAMIN BURLING, of the town of Catharine, in the county of Chenango and State of New York, have invented an Improved Machine or Apparatus for the Purpose of Extracting Stumps of Trees from the Ground; and I do hereby declare that the following is a full and exact description thereof.

The machine which I employ for the extracting of stumps is particularly distinguished for its simplicity, in consequence of which it may be made at a trifling cost, while in action it is perfectly efficient.

It consists of a lever which is usually from fourteen to twenty feet in length, to one end of which is affixed a clevis furnished with hooks, or dogs, or other contrivances for taking hold of the stump; the end upon which this lever bears, and which constitutes its fulcrum, is formed into a quadrant of a circle, which is to be sustained upon a proper bearing, or bed piece, placed upon the ground, and upon which the curved part of the lever rolls as the stump is extracted. When the dogs, or hooks of this lever are first attached to the stump to be raised, said lever is placed in a vertical position, and it is to be drawn down, and the stump raised, by animal or other power drawing by ropes or chains attached to its upper end.

The accompanying drawings represents my machine in perspective, and standing in a vertical position, A, A¹, A², being the lever. The main stem of it, as A, A¹ may be made of four inch plank, which may be about six inches wide at its upper end A, and about fifteen or sixteen inches toward its lower end, as at A¹. At its bottom portion A², it is thickened out by bolting or pinning plank of five or six inches in thickness, on each side of the center plank, so as to give it a tread, or bearing of from fourteen to sixteen inches; this latter plank crosses the grain of the former, and thus gives stability to the whole structure. The curvature given to the end B, B, may have a radius of from two to three feet.

F, F, is a clevis, or strong bow of iron working on a bolt passing through the lower part of the lever, and having its bearing on a bar, or strap of iron with which the extreme end of the curved part of the lever is armed for that purpose.

C, C, are dogs or hooks, which are to be driven into the stump; these dogs have rings, or eyes, on their upper ends, which embrace the clevis F, F. They may be aided by chains, or other devices, according to the form and nature of the stump to be raised.

D, D, is a step, or trough, made of stout plank, sufficiently wide to receive the curved end of the lever between guide ledges raised on each side of it, and this serves as a basis, or fulcrum upon which the lever is sustained and turns. E, E, is a prop, attached to the lever by a joint pin and serving to support it while the dogs are being fixed, after which it is to be turned out of the way.

In using this machine the step, or trough D, D, is firmly embedded on the ground, close to the stump, the lever placed upon it and propped in a vertical position; the dogs are then driven into the stump, or made to embrace its roots, with such auxiliary means as may be found appropriate, the prop is then removed, and the lever drawn down by means of a chain or rope attached to a staple, or ring, at its upper end A. The curved part of the lever will thus be made to roll upon the step D, D, and will also slide upon it toward the stump as it is raised, and the object will be thus effected. In some cases I twist the stump around by placing the lever in a horizontal position, affixing the dogs to the stump, and drawing the lever around, like the sweep of a horse power.

Having thus fully described the nature of my invention, and explained the manner of using the same, what I claim as original therein, and desire to secure by Letters Patent, is—

The manner in which I have constructed said machine so as that by the combined operation of the curved end of the lever, resting in the step D, D, and furnished with the clevis and dogs, formed and operating substantially as set forth, stumps may be raised, and extracted from the ground, in the manner described.

BENJAMIN BURLING.

Witnesses:
 THOS. P. JONES,
 GEORGE WEST.